United States Patent
Kumar

(10) Patent No.: US 9,298,935 B1
(45) Date of Patent: Mar. 29, 2016

(54) DISTRIBUTED PRIVACY FRAMEWORK SYSTEM AND METHOD OF IMPLEMENTATION

(71) Applicant: Piyush Kumar, Tallahassee, FL (US)

(72) Inventor: Piyush Kumar, Tallahassee, FL (US)

(*) Notice: Subject to any disclaimer, the term of this patent is extended or adjusted under 35 U.S.C. 154(b) by 360 days.

(21) Appl. No.: 14/033,431

(22) Filed: Sep. 20, 2013

(51) Int. Cl.
*G06F 17/30* (2006.01)
*G06F 21/60* (2013.01)
*G06F 21/71* (2013.01)
*G06F 21/74* (2013.01)

(52) U.S. Cl.
CPC .............. *G06F 21/606* (2013.01); *G06F 21/71* (2013.01); *G06F 21/74* (2013.01)

(58) Field of Classification Search
None
See application file for complete search history.

(56) References Cited

U.S. PATENT DOCUMENTS

| | | | | |
|---|---|---|---|---|
| 8,205,072 B1 * | 6/2012 | Gentil | ..................... | G06F 21/53 713/150 |
| 8,561,208 B2 * | 10/2013 | Corbett | ................... | G06F 21/53 713/189 |
| 8,654,971 B2 * | 2/2014 | Orsini | ..................... | H04L 9/085 370/228 |
| 9,047,476 B2 * | 6/2015 | Chawla | ................. | H04L 63/102 |
| 2002/0069369 A1 * | 6/2002 | Tremain | .............. | H04L 63/0209 726/14 |
| 2009/0245521 A1 * | 10/2009 | Vembu | ..................... | G06F 21/84 380/279 |
| 2009/0300719 A1 * | 12/2009 | Ferris | .................... | G06F 21/606 726/3 |
| 2010/0024036 A1 * | 1/2010 | Morozov | ................ | G06F 21/53 726/26 |
| 2011/0251992 A1 * | 10/2011 | Bethlehem | .......... | H04L 12/2863 707/610 |
| 2014/0372513 A1 * | 12/2014 | Jones | .................... | G06F 9/5072 709/203 |

\* cited by examiner

*Primary Examiner* — Kenny Lin
(74) *Attorney, Agent, or Firm* — Woodruff & Black, LLC; Paden E. Woodruff, IV

(57) ABSTRACT

An apparatus, program product and method for managing access to a secure, encrypted webserver. A user computer may communicate through a cloud server with the secure webserver via an End-To-End encrypted connection. The webserver being able to run applications, receive and distribute data with similarly secured webservers and receive and distribute data between the webserver and the client computer. The End-To-End Encrypted connection may remain open until the client computer disconnects and the identity of the user is authenticated by a cloud server.

14 Claims, 9 Drawing Sheets

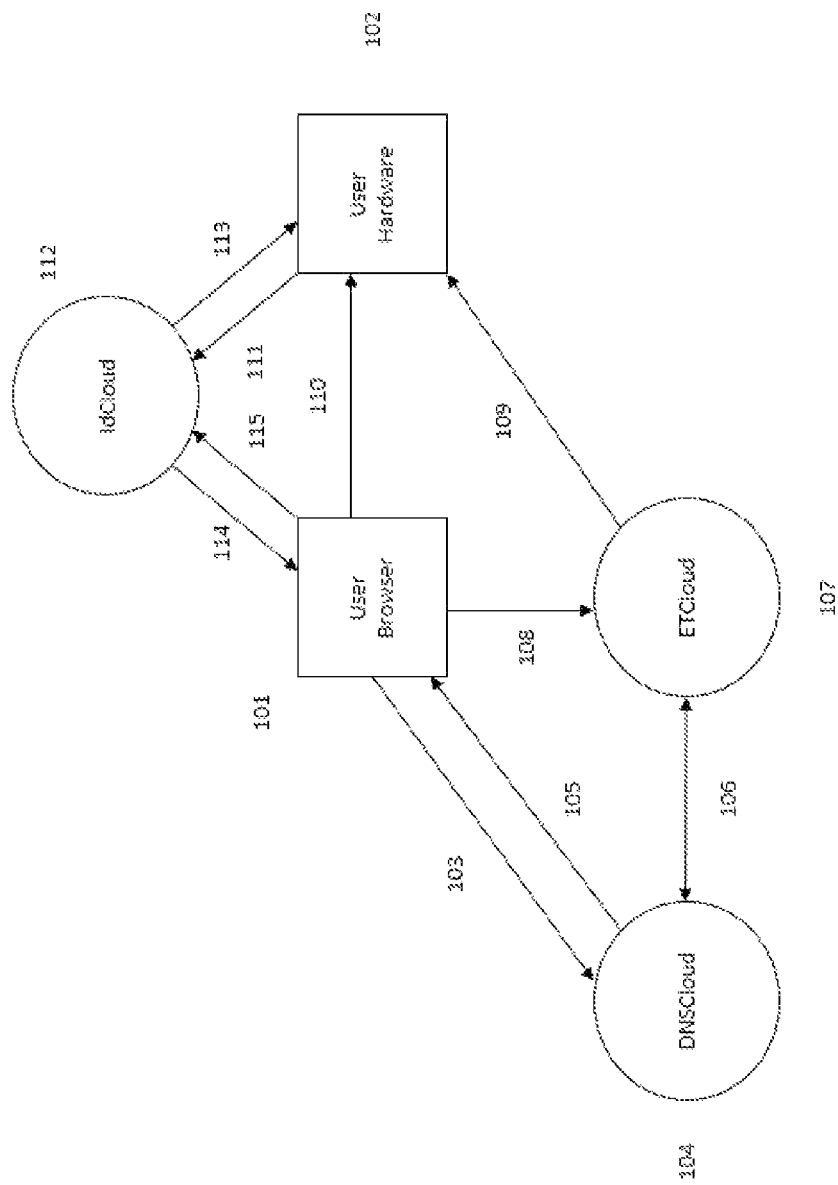
FIGURE: 1

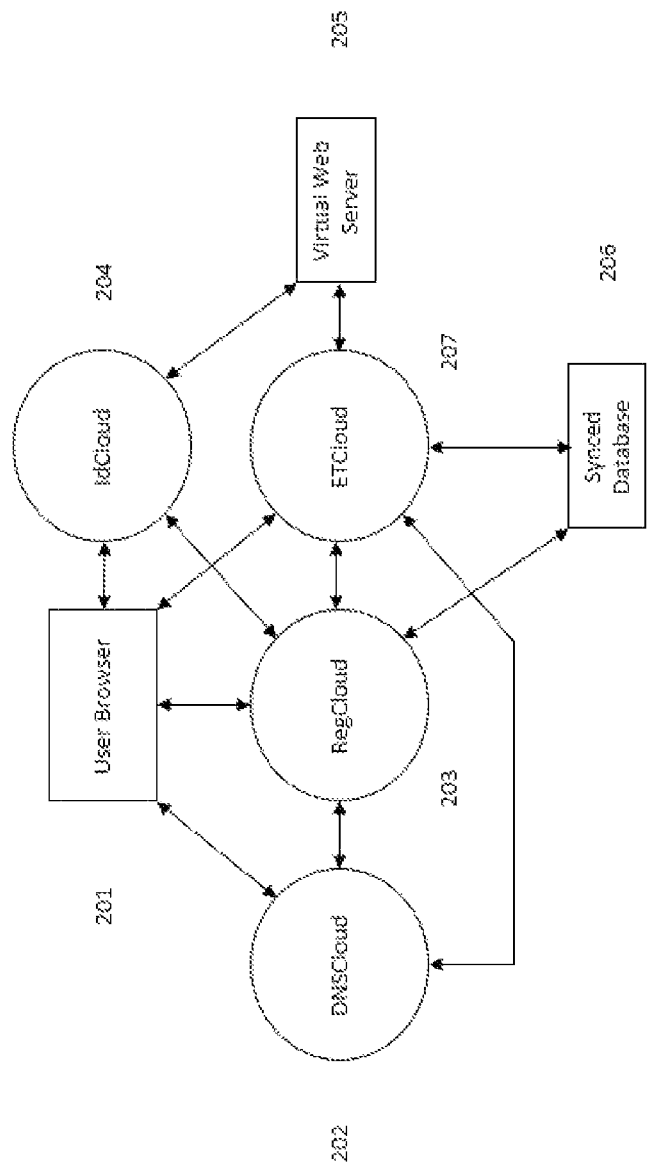
FIGURE: 2A

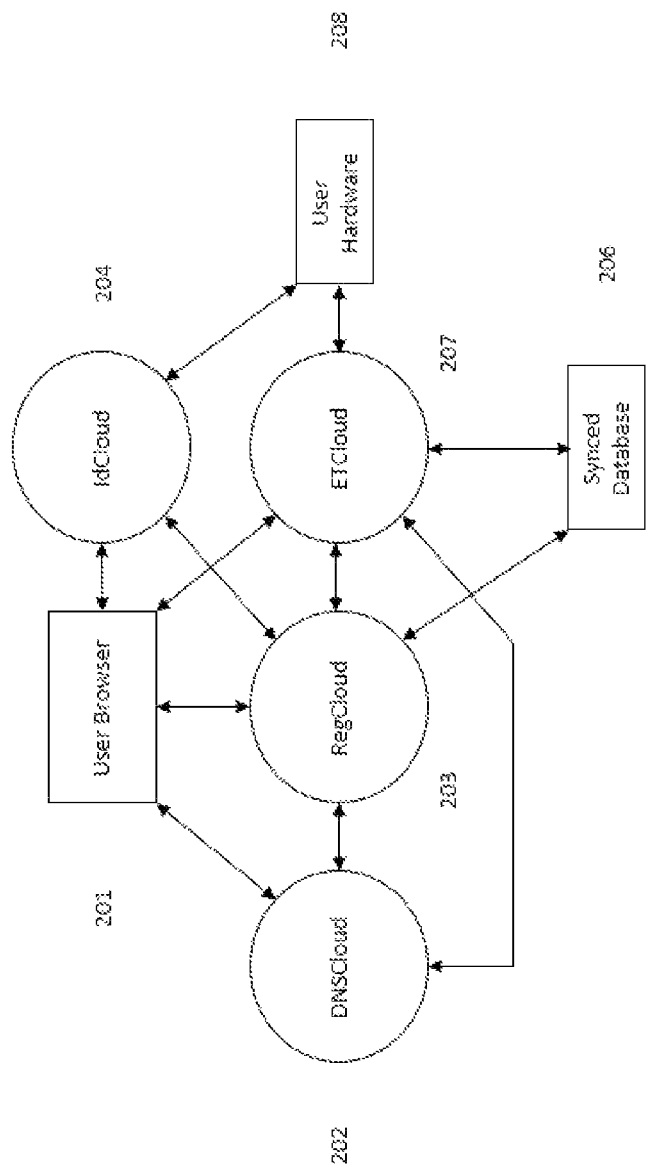
FIGURE: 2B

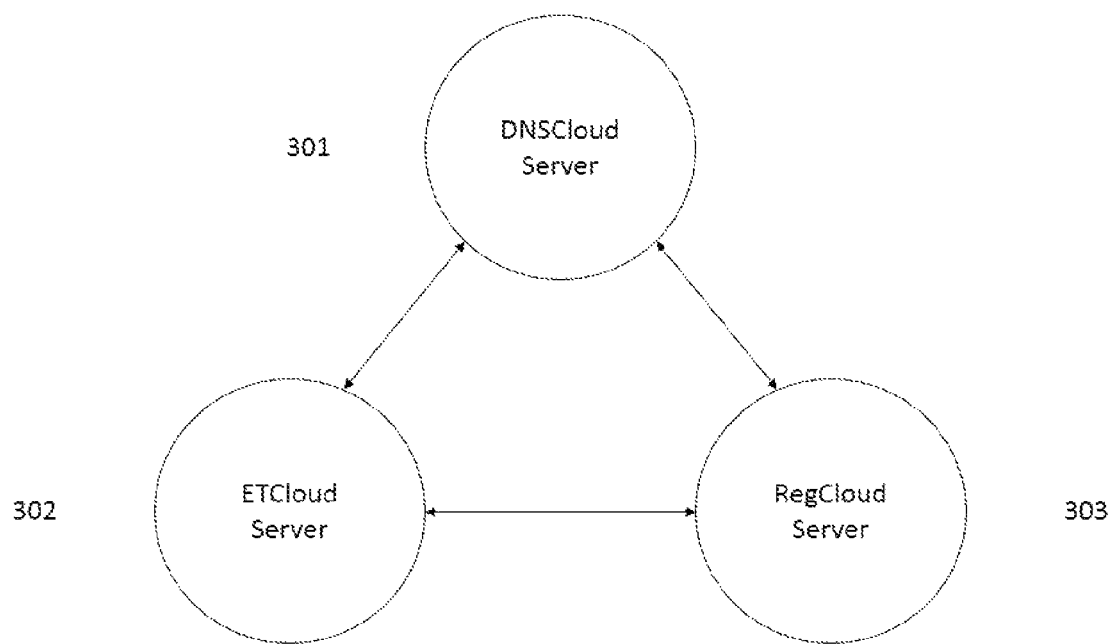
FIGURE: 3

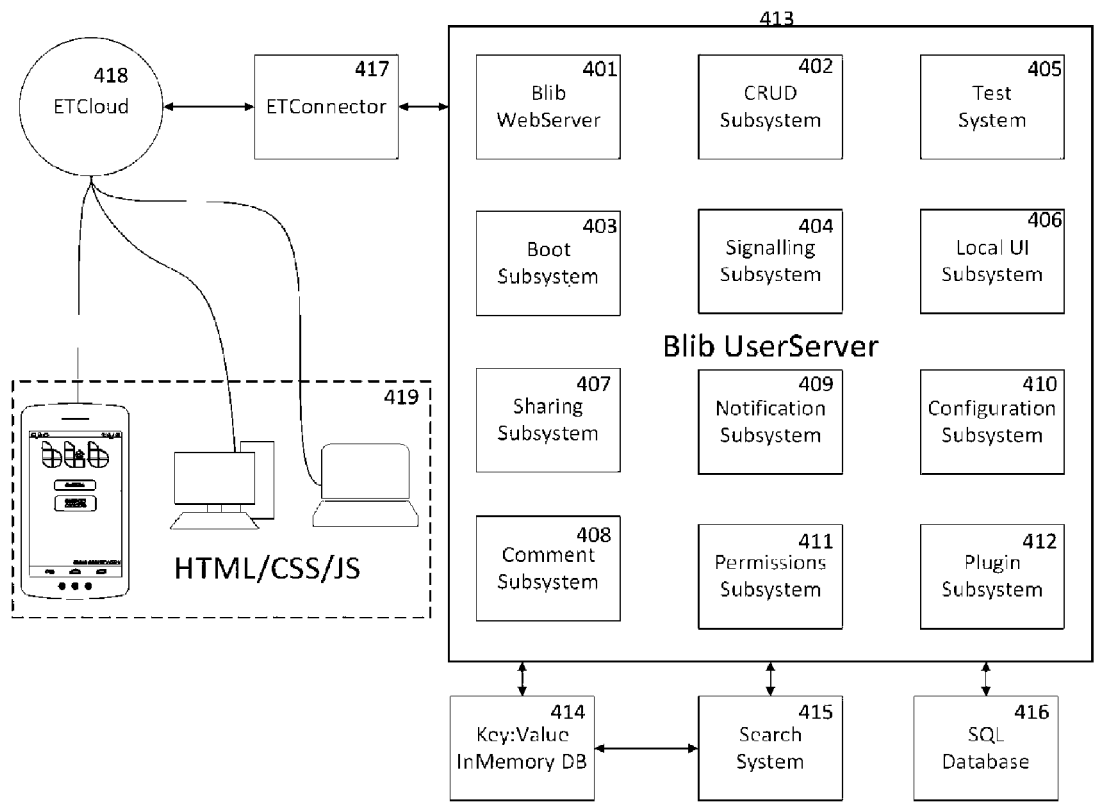
FIGURE: 4

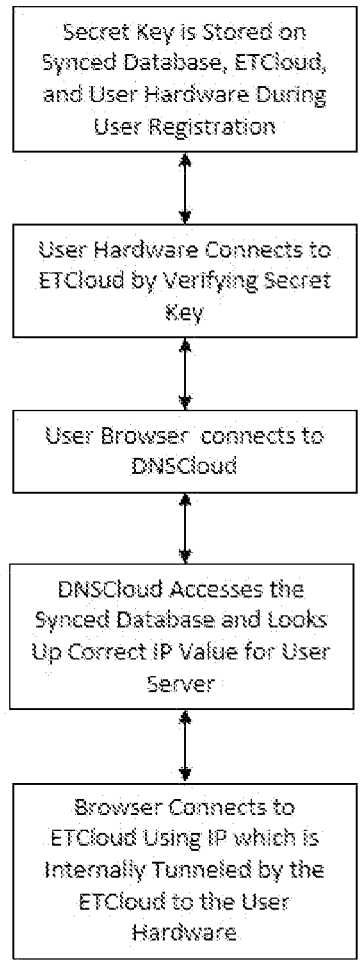
FIGURE: 5

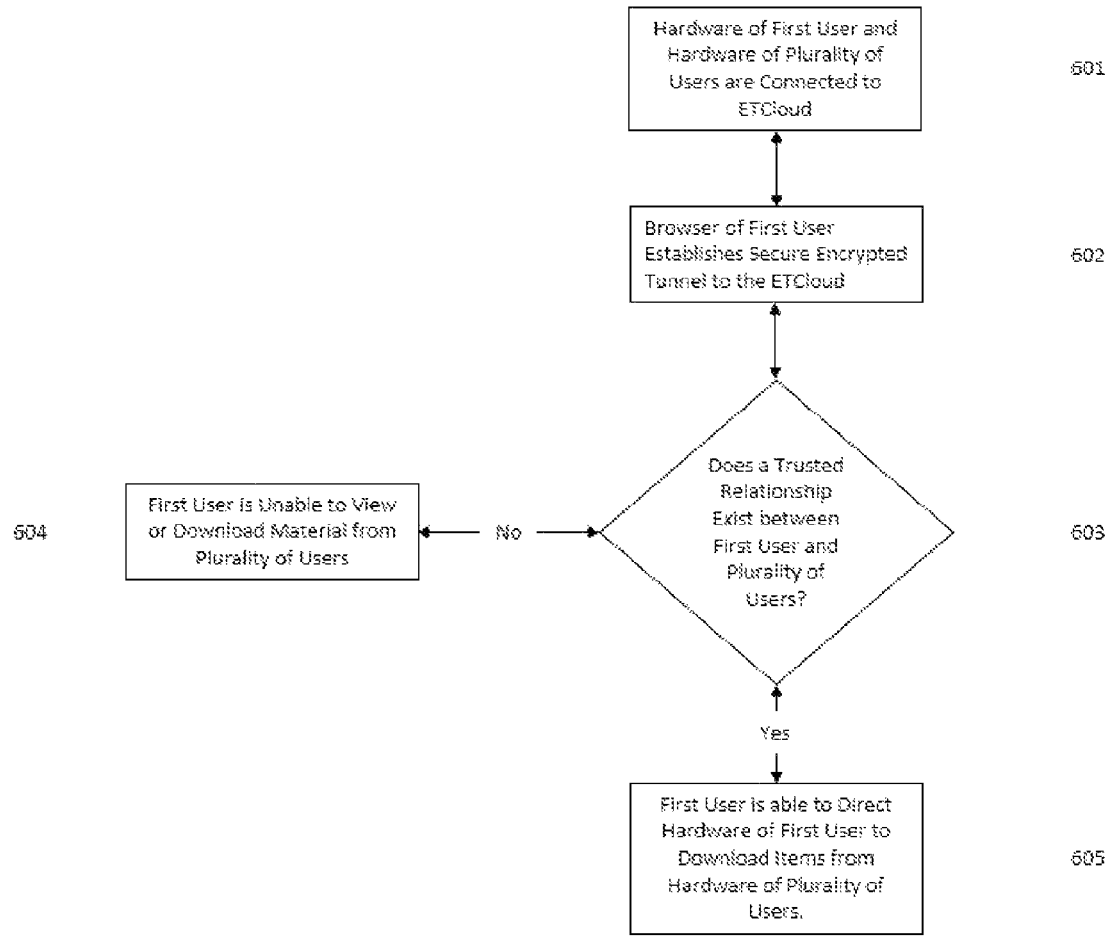
FIGURE: 6A

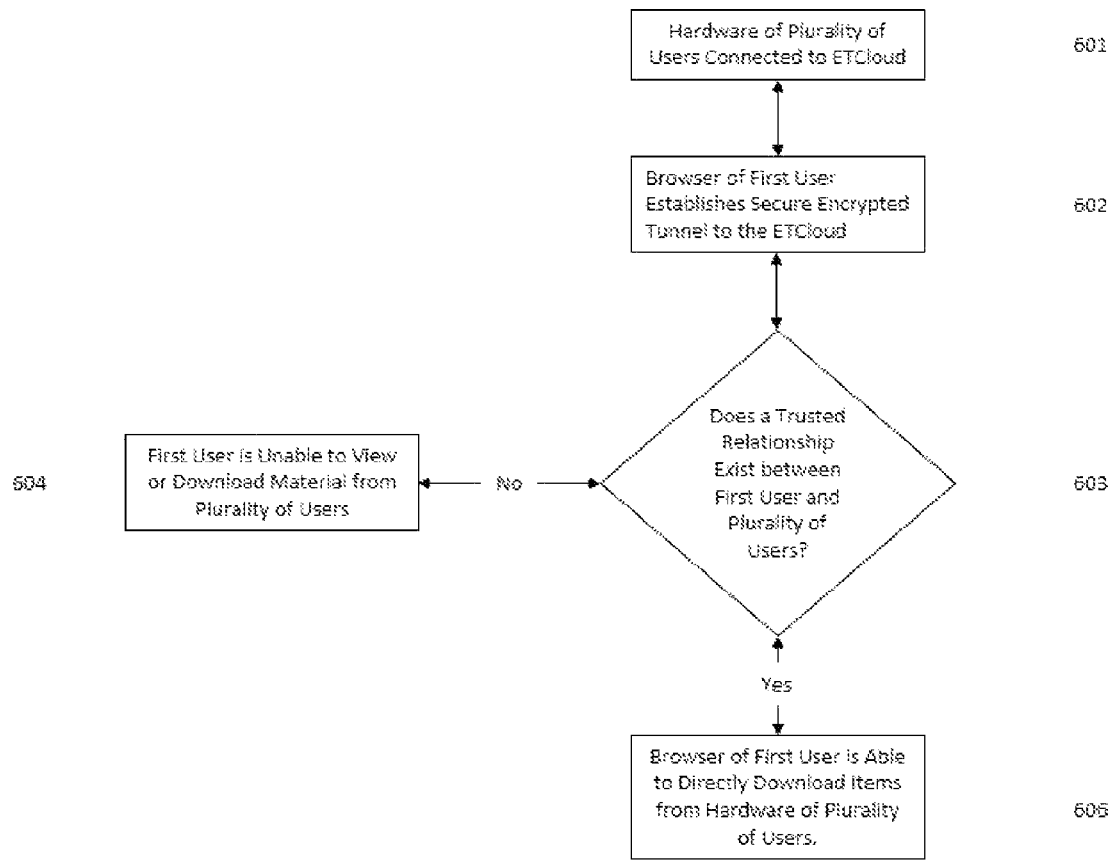
FIGURE: 6B

DISTRIBUTED PRIVACY FRAMEWORK SYSTEM AND METHOD OF IMPLEMENTATION

RELATED APPLICATIONS

This application does not claim the benefit of any other pending application.

FIELD OF INVENTION

The disclosed embodiments of the present invention generally relate to providing private communications of data and applications between trusted peers. More specifically, the present invention relates to a system, method and apparatus for launching and maintaining an Internet based platform from which users have the capability to launch and maintain a complete suite of Internet based applications, while maintaining complete control on the visibility of the data flowing over the World Wide Web.

DESCRIPTION OF THE RELATED ART

Privacy has become a major concern for users of Internet-centric applications. The users of Internet based tools from companies like Facebook, Twitter, Amazon, and Google have come to realize that they are receiving free services in exchange for access to their private data and browsing habits. Free email services, social media, and even cloud storage, by their nature, require access by the provider of said services to a user's personal data. These free services are deployed in a central setting, where all data is stored and processed by a central server or remotely located server farm and thus susceptible to being compromised, either unintentionally or intentionally, by the providers of these free services in an attempt to monetize the information collected from its users.

It is much easier, from a computing resource and content management standpoint, for companies that provide services over the Internet to control user data on a central server or remotely located server farm and provide applications to users from said central server or server farm. Allowing users to run applications from their own computers without passing any information to central server's owned by the providers and producers of said applications is more difficult and deprives the providers of commercially valuable information about users. There are a few commercially available services that have attempted to provide different elements of this service.

The prior art has attempted to provide solutions to the privacy dilemma in a variety of embodiments designed to solve different aspects of the problem. Services like Dropbox allow users to host content on the respective servers of the providers of said services. Users of Dropbox or similar services can then allow access by others to their data for download, or may "push" data to others by emailing links to those with whom the users would like to share data, which allow file downloads that have been preselected by the users of Dropbox or similar services. This structure gives the users of services such as Dropbox the ability to only pass files between other users that are preapproved by the owners of said files. However, the transmission of the data and the contents of the data are inherently visible to the administrators of the network and may be susceptible to data mining by the service provider or otherwise compromised.

Another prior art attempt at providing a solution to the privacy dilemma is Transporter. Transporter is a hardware device that provides for the deployment of a private cloud storage device that allows for syncing, sharing, and accessing data files stored on a user's system via a private cloud service. This is a hardware device which has to be purchased in order to use the service. This service falls short in providing true user privacy in that the device only allows you to share data, it does not allow the user to operate additional applications from the security of user controlled hardware. Another problem with this service is that the names of folders and friends of users are leaked to the administrators of this system.

A software solution that attempts to give users control over their own data is Tonido. With a Tonido account users are provided with a global HTTPS URL through which they can access data on their computers and devices from anywhere in the world. The data is stored on the hard drives of the users and hence the users have total control of the data in their possession. Just like Transporter, this software solution also falls short of providing a truly anonymous data and application platform. This is only a solution for accessing and syncing data with an encrypted connection on the computer of a user from anywhere in the world.

Filecloud is another service attempting to solve the privacy dilemma. It is based on Tonido but directed towards enterprise solutions. Filecloud gives users the capacity to run their own virtual dropbox so that they have control over data that they own. Filecloud provides remote access to user data stored on user hard drives, provides the option of sharing data between different users and also provides the option of syncing the data across different devices, in effect creating something that is very similar to other data sharing cloud services that are available throughout the Internet. Filecloud, like the other cited prior art, also falls short of providing users with an anonymous data and application platform, that is to say, it is not a platform for launching a user's own applications, for example applications like a photo library similar to Picasa or a library application similar to Mendeley. The service, like the other prior art, does not allow users to launch applications or share data from the confines of a user's own secure system and have full control over his or her own data and applications that access said data.

Another service which provides users with private data storage is SpiderOak, which has a policy of "zero-knowledge", that is, when the company stores user data on the SpiderOak system the data is encrypted using keys that are generated using the password of the user, said password being withheld from the SpiderOak servers. As a consequence of this, people having access to the SpiderOak servers cannot see or read the user data that has been stored there, thus in turn the servers that store the data have zero knowledge of said data. This service, like the other cited prior art, also falls short of providing users with an anonymous data and application platform. This service is simply cloud storage that backs up the user data in an encrypted manner. This service allows the users to access data from anywhere on any device and allows sharing of data between different users. This service does not allow for the launch or utilization of an application suite. Another problem with SpiderOak is that the encryption key to decrypt user data is available to system administrators of SpiderOak.

Other providers of the prior art attempting to provide solutions to the privacy dilemma include the Tor Project, the programmers of which have attempted to solve the privacy dilemma of internet traffic by providing private connections to route internet traffic through a free, worldwide volunteer network consisting of thousands of relays designed to conceal a user's location or usage. Although this framework gives the users of the Tor Project a limited ability to protect their data and communications, it too is flawed. The transmission of files and data is routed through users that are not personally identified or trusted by the sender or receiver of the data, nor does the Tor Project require that the sender and receiver share a "trusted" relationship.

Another similar project is that of I2P and Perfect Dark. The difference between these projects and TOR is that TOR uses a technology known as the Onion Routing protocol whereas these two projects are based on a technology known as Garlic Routing. But overall the I2P and Perfect Dark projects have the same inherent problem that the TOR project has, in that the routing happens through an anonymous network provided by volunteers that may not be trustworthy. Moreover, projects like TOR and I2P and Perfect Dark simply provide a way to allow users to anonymously browse the Internet, and do not in any way provide a platform for a user to privately run an application suite from the confines of his computer or his hardware.

Another attempt by the prior art to provide secure and novel digital applications delivered over the internet has been by Google, with online services such as Gmail, Google Drive, and Google Calendar. Gmail, Google's email client, is provided to users free of charge. However, users' emails and contacts are stored on the "cloud", on hardware that is inaccessible to the user. Emails sent by users of Gmail are not secured in any way. Additionally, in exchange for free email services, Google displays advertising to its users. In order to better target advertisements to users, Google scans every email that is sent or received by users, looking for keywords so that relevant advertising can be delivered to users' inboxes. This presents major privacy issues for users. Professionals in industries where confidentiality is of the utmost importance, for example military contracting or the practice of law or medicine, may inadvertently disclose classified or sensitive materials to Google's scans. Additionally, there is the issue of the reliability of the servers on which the emails and data are stored. If the servers are compromised either physically or electronically, the data and files of the users may be susceptible.

Other attempts by the prior art at providing secure online digital applications for achieving data privacy for users include services like Enigmail, Hushmail, VaultMail and Mailgun. These service providers are attempting to give users the option of having a private and secure email service. But these still fall short of providing a secure and private email application because the service is still hosted through central servers run by the providers of the service. Although more protected, cryptographically, than say Gmail, these services also do not accomplish the goal of providing a secure interface platform for storing, sending and receiving emails. Emails and contacts are not solely stored on hardware controlled by the user and as such are susceptible to compromise.

There are a variety of reasons and situations in which users may desire to transmit or receive data securely, or to host or run applications in a manner that prevents the activities of the users of said applications from being compromised. Therefore, it is desirable to create a system that utilizes novel methods of isolating data and applications and providing access to said data and applications through a secure and encrypted connections technology and providing a system and methods for an application platform that uses said secure and encrypted connections technology to operate between trusted peers. Such a novel system and methods are described infra.

BRIEF DESCRIPTION OF THE SEVERAL VIEWS OF THE DRAWINGS

FIG. 1 is a block diagram depicting one embodiment of the connection of a user to user's hardware through the user verification system of the present invention.

FIG. 2A is a block diagram depicting one embodiment of a method of registering a user.

FIG. 2B is a block diagram depicting another embodiment of a method of registering a user.

FIG. 3 is a block diagram depicting the relationship between the three main cloud elements of the system of the present invention.

FIG. 4 is a block diagram depicting one embodiment of the modules of the software system of the present invention and said modules interaction with each other.

FIG. 5 is a flow diagram depicting one embodiment of the flow of information between components in one embodiment of the system.

FIG. 6A is a flow diagram depicting one embodiment of a method of connecting hardware between users.

FIG. 6B is a flow diagram depicting another embodiment of a method for connecting hardware between users.

DETAILED DESCRIPTION OF THE INVENTION

Figure 7:
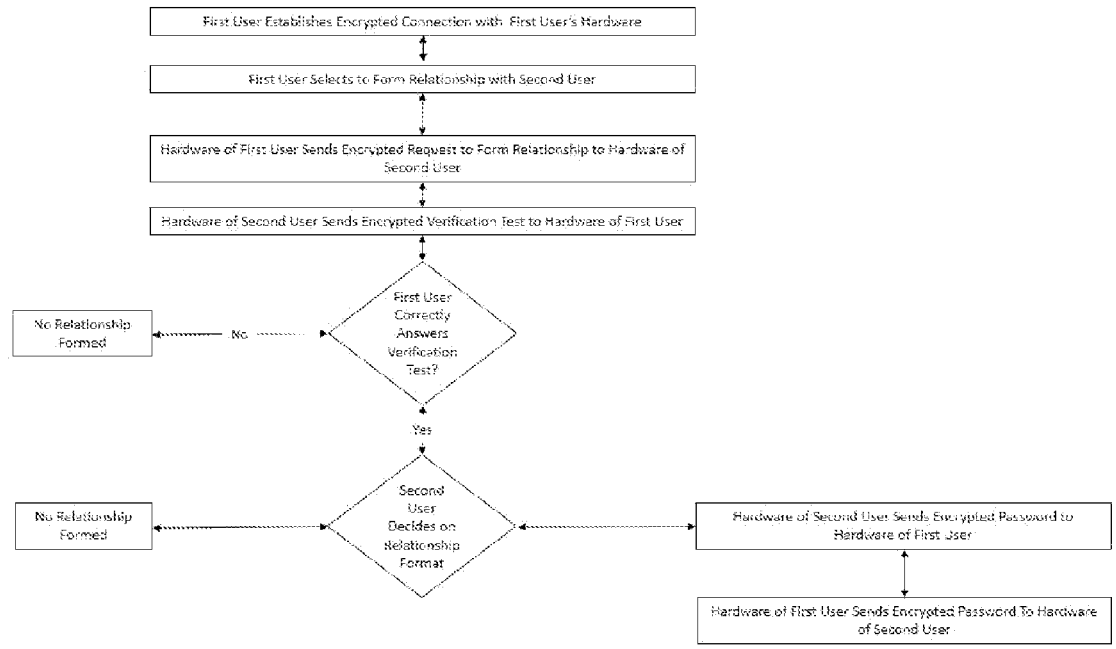
FIG. 7 is a flow diagram depicting one embodiment of a process for creating trusted relationships between users.

The present invention is a platform for hosting different types of applications and data utilized by the user in a fully distributed manner, in which the platform is installed and run from the privacy of the personal computer or hardware controlled by the user. The aforementioned platform will provide the background for hosting a plurality of applications such as email servers, social networking tools, office tools and other utility tools that will be connected to the broader Internet through the base platform and which can be accessed from anywhere at any time.

In a preferred embodiment, the platform of the present invention is capable of allowing users to run their own web applications, including running a database from user controlled hardware. All data entering and leaving the user controlled hardware running the software platform of the present invention is encrypted using SSL/TLS protocol except for random bits, such as cryptographic nonces. A first user controlled hardware running the software platform can communicate with a second user controlled hardware running the software platform using, for example, the HTTPS protocol or a direct connection formed by opening a TCP/IP socket and utilizing the IP databases of the Registration Cloud (hereafter referred to as the "RegCloud"). The RegCloud is made up of a plurality of computers connected through a communication network. The RegCloud assists in the registration process for new users of the platform of the present invention. When forming a direct connection, both the first and second user controlled hardware open a TCP/IP connection to the RegCloud. The RegCloud then provides the software platform with IP and port information to allow a direct socket to be formed. User Authentication, in a preferred embodiment, is accomplished with HTTPS and the use of the key shared between the RegCloud and the software platform. Encryption of the communication between the two platforms is done using AES, and the sharing of the key is accomplished by using RegCloud. Both the encryption mechanism and the authentication mechanism can be changed and replaced by more standard or complex authentication and encryption protocols to obtain a higher degree of security and privacy where such changes are necessary.

The platform of the present invention, in a preferred embodiment, does not store user data or applications on a proprietary cloud managed by an entity other than the owner of the data or applications. The data and applications of the user is stored on hardware or on hardware virtualizations controlled by the user. In doing such, users of the present invention do not expose the data or application contents of their hardware to any central figure or administrators, or any figure not approved by the user. In doing such, this platform prevents intermediaries from mining user data or user habits. Communication between other users and the outside world is done by end-to-end encryption using Secure Socket Layer (SSL)/Transport Layer Security (TLS) protocol. The software platform of the present invention acts as a receptacle that contains all hosted applications. The platform provides the basic functionalities to the hosted applications for communicating securely to the Internet and also provides an abstraction layer over the native operating system through which the hosted applications gain access to the operating system services like reading and writing application and user data.

In a preferred embodiment, the functionalities of the software platform of the present invention comprise: a) the ability to run an HTTPS server, with the option of utilizing verified certifications for the user; b) allowing the user to access the software platform from anywhere in the world, such communication utilizing end to end encryption; c) the ability for a plurality of software platforms to interface, exchange data, and otherwise communicate with each other; d) provide an abstraction layer over the file system of the native operating system so that the applications being hosted can use the file system services of the native operating system from within the system of the present invention; e) provide fast indexing and searching of digital content items hosted on the software platform; f) file transfer and synchronization services using the native OS and network services; g) automatically collect metadata from the Internet for files stored on the software platform without disclosing the fact that said metadata is being collected; h) allow comments to be written on files and shared amongst approved users; i) allow web applications like email, calendar, social networking, and photo albums to be used within the software platform securely, without leaking data; j) allow encrypted access from mobile phones, tablets, and other mobile electronic devices in the form of an application that allows for encrypted messaging, photo sharing, texting, and other mobile applications to run in a private manner; k) run a notification system that monitors system messages and messages from outside the system. Allow the user to selectively interact with these notifications; l) allow files to be shared with preapproved trusted friends so data is not compromised. In one embodiment, in addition to being approved by the user of the software platform before a friend can access digital items said friend must also enter a password; and m) provide a plugin architecture to better enable third party authors to write plugins using the API of the present invention.

In one embodiment, one of the applications provided and hosted by the platform of the present invention is an emailing application. Unlike any of the prior art, the entire inbox of the user will be hosted on the hardware of the user, giving said user control over his data. There is currently no application which allows for the freedom and protection of a user's complete control over his emails and contacts. Although email clients like Mozilla's Thunderbird and Microsoft Outlook can store emails and contacts on a user's hardware, a copy of the user's emails is stored on a server maintained by the party providing the mail server. Thunderbird and Outlook store data in a users' hardware, and don't provide control of the data to the user, as it is stored on the Thunderbird and Outlook company servers.

In a preferred embodiment, a user who has installed the present invention on his hardware will have the following features: a search engine, which will search through all data items located on said user's hardware and all data items accessible through any other users of the present invention that said user has created a "trusted" relationship with; an email system, wherein the entirety of the user's emails and contacts are exclusively stored on hardware controlled by said user; social networking, wherein a user's interactions and relationships, and any additional content associated with social networking is stored exclusively on hardware controlled by said user; a photo album, wherein a user's photos are stored exclusively on hardware controlled by said user; and an e-reader and library application, wherein user's e-books are stored exclusively on hardware controlled by said user. These applications and data items, through the platform of the present invention, can be accessed anywhere in the world.

Although the administrators of the system are not able to discern the data a user may have on his software platform, it is preferable that the administrators have the ability to deregister a user so that he is no longer able to distribute to other users.

In one embodiment, in which the user runs his instance of the present invention through a host company, said host company maintains the user data and applications on the server cloud of said host company. As such, the administrators of said cloud could have the ability to gain access to the data and applications of the user if a law enforcement request was made for a particular user's data and applications.

The most common embodiment of the present invention deployment will be through the hardware of the user. In such a scenario the data and applications of the user will be hosted on the user hardware and the administrators of the system will have no access to the aforementioned data and applications except for some metadata about the user that is stored in its servers for authentication purposes. In case of a law enforcement request made to the administrators for the data and applications of a user, said user running a copy of the present invention from the confines of the hardware of said user, if the administrators after review of the request decides to comply, all that can be given to the law enforcement agency is the metadata of the user in question and access to the encrypted pipe through which the user communicates with the outside world. Whether the agency concerned can use this access will depend on the agency. The administrators will not be able to provide any decipherment of the traffic over the encrypted channel as the administrators of the system do not have such capabilities.

FIG. 1 illustrates one embodiment of a user connecting to a networked hardware device, 102, of the present invention with a web browser, 101. The web browser of the user, 101, submits a query to the Domain Name System Cloud, (hereafter referred to as the "DNSCloud"), 104. The DNSCloud is made up of a plurality of computers connected through a communication network. The DNSCloud helps directs users to form connections with computers appropriate for said users' tasks. The user directs the web browser, 101, to connect to the DNSCloud, 104, by, in a preferred embodiment, entering a URL, 103, into said web browser. The Encrypted Tunnel Cloud, (hereafter referred to as the "ETCloud"), 107, returns an IP address to the DNSCloud after the DNSCloud makes a request, 106, for said IP Address to the ETCloud. The ETCloud is made up of a plurality of computers connected through a communication network. The ETCloud helps users form encrypted tunnels between the browser, 101, and the platform of the present invention which runs on the user hardware, 102. The DNSCloud, 104, returns an IP address, 105, of a machine in the ETCloud to the browser, 101. In other embodiments, the DNSCloud can also lookup the machine information using RegCloud (not shown) or the Synced database (not shown).

The IP address, 105, provides the browser with the location of the machine in the ETCloud, 107, that is the shortest networked path the browser can take to reach said machine located in the ETCloud. The browser then connects to the machine in the ETCloud, 107, using, in a preferred embodiment, the HTTPS protocol. The connection between the ETCloud and the browser is then patched, 109, to the user hardware, 102, said user hardware also being connected to the ETCloud, preferably, by the HTTPS protocol. Patching is a term of art that will be recognized by those skilled in the field as referring to a dynamic real-time reverse proxying mechanism. Those skilled in the relevant art will be familiar with the concept of a reverse proxy as a type of proxy server that retrieves resources on behalf of a client from one or more other associated servers, said resources appearing to the client as having originated from the reverse proxy rather than said other associated servers. In a preferred embodiment, the web browser of the user, connects to the most efficient machine available in the ETCloud. That machine then acts as a reverse proxy for the user's hardware or hardware virtualization. The web browser will be connected to the reverse proxy by a secure encrypted tunnel network connection and the user hardware or hardware virtualization will be connected by a secure encrypted tunnel network connection. It will be clear to one skilled in the art that a plurality of embodiments may accomplish the task of efficiently connecting the web browser of the user to the hardware of the user.

The ETCloud helps users form encrypted network connections between the user web browser, 101, and the user hardware, 102. The ETCloud listens for incoming signals, in a preferred embodiment, at port 443, which is reserved for HTTPS communications, and accepts connections from user web browsers using HTTPS and also from the user hardware which is running the software platform of the present invention. The connections from the user web browser, 101, are patched or forwarded using socket forwarding to the correct user hardware running the software platform of the present invention. In one embodiment, the opened sockets of the user browser are multiplexed to one open socket from the user hardware running the software platform of the present invention to the ETCloud. In another embodiment, one or more sockets from the user hardware running the software platform are opened and used to patch to the ETCloud. The sockets that connect from the user hardware running the software platform to the ETCloud are authenticated, in a preferred embodiment, with the Time based One Time Password Algorithm (hereafter referred to as "TOTP") and cryptographic nonce. The user hardware running the software platform uses a password key that is concurrently available to the ETCloud through a synced database. Both the cryptographic nonce and shared password key, in a preferred embodiment, can be securely accessed with an encrypted connection, for example using HTTPS. The patching at the ETCloud can be accomplished with, for example, HTTPS SNI.

An encrypted connection is thus formed by a web browser, 101, that has connected to a machine in the ETCloud, 107, with a first encrypted tunnel connection, said machine in turn connecting to user hardware, 102, with a second encrypted tunnel connection said connections preferably using the HTTPS protocol. Once a connection has been formed between the web browser, 101, the ETCloud, 107, and the user hardware, 102, a login request, 110, is submitted to the user hardware, 102, from the user browser, 101. The user hardware, 102, forwards the user, 111, to the Identification Cloud (hereafter referred to as the "IdCloud"), 112 which identifies the user using an identification mechanism. In some embodiments this identification mechanism could be either a password, bio-metric security device or other security mechanism. The IdCloud is made up of a plurality of computers connected through a communication network. The IdCloud helps to authenticate a user to his or her respective hardware by pushing a verification request, 114, to the user browser and analyzing the user's response, 115. The IdCloud, in a preferred embodiment, uses OpenID or OAuth protocols for user verification. The IdCloud verifies the user login information provided by comparing said login information to its records. If the verification confirms the identity of the user, IdCloud notifies the user hardware, 113, that web browser, 101, should be granted access.

One embodiment of a method of connecting the user to the user's hardware has a user enter a URL into a web browser. The URL is dynamically resolved using a DNSCloud to a machine in the ETCloud, which acts as a dynamic real-time reverse proxy to the user hardware. This allows the formation of an encrypted tunnel between the user browser and the user hardware.

FIG. 2A illustrates one embodiment in which a user registers to use the system of the present invention. In one embodiment, the RegCloud, 203, is in charge of registering new users to the system. The user browser, 201, queries the DNSCloud, 202, which returns the IP address of the machine in the RegCloud, 203, that is best suited, i.e. most reliable and fastest, for the user browser, 201, to connect to. The RegCloud, 203, forms an encrypted tunnel network connection, in a preferred embodiment using the HTTPS protocol, with the IdCloud, 204. OpenID or OAuth is used by the IdCloud to identify the user and return an identification token to the RegCloud. The RegCloud then issues a unique user identification key which identifies users and user hardware and stores it, in one embodiment, both in a synced database, 206, which is accessible by the RegCloud and ETCloud, 207, as well as on the user's virtual web server machine, 205, which is hosted on a cloud. The DNSCloud, 202, upon receiving a registration request from a user web browser, 201, directs said web browser to the RegCloud, 203. In some embodiments where a user chooses to utilize a hosted web server to run the platform of the present invention, for example a cloud service, the RegCloud will be tasked with allocating and setting up the connection from the user web browser to the user hosted web server by appropriately modifying the Synced Database and hence influencing the DNSCloud lookup result (not shown). In one embodiment, the system uses either user identifications or email addresses as lookup keys for fast retrieval of user records from the synced database. Through the RegCloud, 203, administrators are allowed to add, edit, delete, view, or ban users. In one embodiment, this feature can be accomplished with a web application or similar tool.

The RegCloud, 203, which has established a connection on startup with the ETCloud, 207, is constantly updated by the ETCloud on which users have formed encrypted network connections and using what routes, as well as which users' virtual web server machines are running the software platform and connected to the ETCloud. This information is also provided to the DNSCloud, 202, which has also established a connection on startup with the ETCloud and the RegCloud, to point browsers to the correct IP addresses. The RegCloud, 203, has a mailing subsystem (not shown) for sending emails to users or subsets of users concerning registration or other announcements.

In a preferred embodiment, the RegCloud, 203, maintains a high availability synced database, where every instance of the database has the same data. If one instance of the database gets an update, that update is propagated to all the other databases of the RegCloud. If a database goes down, the RegCloud syncs with one of the working databases when it is switched back on. The syncing is done, in a preferred embodiment, using the HTTPS protocol and REST APIs. The syncing could also be accomplished using UDP, TCP/IP, or any other network communication system.

The RegCloud preferably constantly maintains what parts of the ETCloud and DNSCloud are alive or dead. This information is regularly requested by the user system in order to form connections to the ETCloud. This information is also preferably convertible into an HTML file and able to be served through the WWW to the administrators of the Cloud.

The ETCloud preferably constantly provides the RegCloud information on which users' systems have formed new encrypted tunnels and what routes were used to form said tunnels, as well as which users' systems have disconnected from the ETCloud and at what times said disconnections occurred. This information is then provided to the DNSCloud to point web browsers to the correct IPs.

FIG. 2B illustrates another embodiment in which a user registers to use the system of the present invention. Similar to the embodiment of 2A, the RegCloud, 203, is in charge of registering new users to the system. The user browser, 201, queries the DNSCloud, 202, which returns the IP address of the machine in the RegCloud, 203, that is best suited, i.e. most reliable and fastest, for the user browser, 201, to connect to. The RegCloud, 203, forms an encrypted tunnel network connection, in a preferred embodiment using the HTTPS protocol, with the IdCloud, 204. The RegCloud, after consultation with the IdCloud, then issues a unique user identification key which identifies users and user hardware and stores it, in one embodiment, both in a synced database, 206, which is accessible by the RegCloud and ETCloud, 207. The unique identifier key is also entered into a piece of physical hardware, 208, which will be shipped to the user. In a preferred embodiment, the identifier key is stored in the user hardware in such a way that it is never visible to another person.

FIG. 3 depicts the relationship that exists between the DNSCloud, ETCloud, and RegCloud. When the DNSCloud Server, 301, ETCloud Server, 302, and RegCloud Server, 303, are powered on, an encrypted tunnel network connection, said connection preferably using the HTTPS protocol, is automatically created securely connecting and allowing for communication between the three server clouds.

The DNSCloud, RegCloud, and ETCloud are all run as high availability clouds, and are on all the time. Parts of the cloud servers can fail, but, in a preferred embodiment, the designs of the clouds accommodate for this eventual failure by utilizing a synced database and the HTTPS REST API. The synced database allows the machines to fail and come up at will. When any part of the cloud is coming up or being switched on, it uses database synchronization to make sure it is up to date.

FIG. 4 displays a block diagram describing the interaction of the UserServer software, 413, of the present invention with the ETCloud, 418, and other interacting modules. The UserServer software, in a preferred embodiment, is comprised of 12 primary modules. These modules are the Webserver, 401, the CRUD Subsystem, 402, the Boot Subsystem, 403, the Signaling Subsystem, 404, the Test System, 405, the Local UI Subsystem, 406, the Sharing Subsystem, 407, the Comment Subsystem, 408, the Notification Subsystem, 409, the Configuration Subsystem, 410, the Permissions Subsystem, 411, and the Plugin Subsystem, 412.

In a preferred embodiment, the Webserver module, 401, is designed to be a light weight, robust, scalable and pluggable https server. In said preferred embodiment, there are two parts to the Webserver module interface. The first part of said interface is created and maintained using a MVC, or Model-view-controller, application framework in Python which is designed as a wrapper on the Python WSGI, or Web Server Gateway Interface, framework. The MVC application framework is hosted within the Webserver module, 401. The MVC framework presents a web based UI to the user of the present invention which can be used to access the different applications that are hosted on the platform. The primary purpose of the "view" layer of the MVC system is to capture the user requests and route the request to a set of view classes which pass on the request to a set of handlers. The responsibility of the handlers is to handle the request. In order to handle the user request the handlers communicate with the different parts of the present invention and pass on the request parameters to the actual modules which process the request. The results from the modules are sent back to the handlers which send the response back to the view layer which formats the data and displays the final results to the user.

In a preferred embodiment, architecture of the Webserver module allows the possibility of adding more frameworks to it. Examples of such additional frameworks comprise Email systems, with a mail server and an application server for sending and receiving emails, a Chat system with a chat server for receiving and sending instant chat messages between different users and services like VOIP.

The Webserver also, in a preferred embodiment, acts as one of the parts of the system that communicate with the World Wide Web (hereafter referred to as the "WWW"). In one embodiment, the Webserver is the main interface through which communication with the World Wide Web occurs. The Webserver is responsible for handling any incoming request to the system in some embodiments. The webserver is exposed to the WWW using port forwarding techniques such that the Webserver which is running on the user's system is available on a static IP address on the WWW. The detail of the subsystem which handles this forwarding is described as a separate module.

The CRUD module, 402, which in programming parlance stands for the four essential functions of essential storage, "Create, Read, Update, and Delete", provides a single point of entry, update, and deletion for any and all media or data that enters into the system. In a preferred embodiment there are only two types of data that enter the system. The first is the data that is inputted by the owner of the system, comprising items such as digital books, digital photos, digital music, and other types of media that the user desires to host on the system. The second class of data is that which is implicitly generated by the system based on the user's usage patterns. The CRUD module is concerned with only the first type of data, data which is user inputted, and provides the interface for the user to add explicit data to the system. In a preferred embodiment the CRUD module has a pluggable design allowing the data formats acceptable by the module to be easily extendable to encompass virtually any desired data format. The CRUD module is preferably responsible for generating notifications that are used system wide and are responsible for maintaining the state of the overall system. An example of such a notification is the addition of new data. Whenever new data is added to a user's system, in a preferred embodiment the CRUD module generates notifications that propagate system wide and update the different subsystems and modules in relation to this addition. Similar notifications are generated when existing data is updated or deleted. The CRUD system has been designed as a pluggable and extensible framework.

The Boot module, 403, runs on top of the Operating System on the system. In a preferred embodiment this module is responsible for starting most of the other subsystems and modules of the system at boot time. This module defines the base class for a "server" which has both startup and shutdown functionality. Any subsystem or module that needs to start at boot time is derived from this base class. This subsystem automatically calls the startup/shutdown function in all subsystems at the correct time. In a preferred embodiment, at startup this module starts the following subsystems and modules: Configuration module, CRUD module, Webserver and web module, Local UI module, Sharing module, Notification module, Database module, Plugin module and Search module. In other embodiments where additional modules and subsystems are incorporated into the system the CRUD module would preferably be responsible for booting said additional modules and subsystems. The Boot module is also responsible for starting these modules and subsystems as completely separate processes or in different strings.

The Signaling module, 404, is used, in a preferred embodiment, for communication between various subsystems and modules inside the system. The module implements a publish-subscribe design where any module, subsystem or component interested in a particular signal registers itself with the Signaling module to be notified, in some embodiments via a function callback, once said particular signal is raised. This results in the Signaling module queuing that subsystem, module or component interested in said particular signal to a signal specific queue. Once the signal is raised, the Signaling module notifies each registered subsystem, module or component by calling the registered callback function. Various components in the system can be modified by multiple other components. The Signaling module preferably ensures that any change to a subsystem, module or component from multiple sources are passed as notifications to any interested subsystem, module or component through a common interface.

The Testing module, 405, is responsible for creating and running a core version of the system and executing any tests of the system within the framework of the core system. The Test system is also designed in a pluggable manner so that for every new subsystem, module or component added to the system the Test module can be extended with tests appropriate for the newly added subsystem, module or component.

The Local User Interface (hereafter referred to as the "UI") module, 406, exists as a thin layer on top of the user server and communicates with the server through the same interface which is used by the REST API. In a preferred embodiment the interface has three tabs in the main window, Browse, Add and Settings. The Browse tab provides the main view of the data that the user owns. The Add tab gives the user the ability to add data from a local disk to the system. Once pointed to a directory, this module searches through the directory for appropriate data matches as specified by the user. The Settings UI allows the user to control various settings within the system.

One embodiment of the invention provides a user with a desktop interface which is powered by Python's PyQt framework. It allows the user to connect with the user server directly without communicating through the REST API which the web/mobile interface needs. In situations where large files need to be added to the system, the local UI can be a fast alternative.

The Share module, 407, of the system is responsible, in a preferred embodiment, for managing sharing of data amongst different users of the system. It is possible to establish friendship between two users which can enable either uni-directional or bi-directional sharing of data. Additionally, a user can group his friends into specific units, all of whom can then be given specific access to specific data owned by said user. The creation of a friendship relation between two users involves, in a preferred embodiment, a handshake between the systems of the two users over the REST API, all requests being stored in persistent storage of the systems of both users. In the preferred embodiment, the friendship handshake starts when a first user sends a friendship request to a second user. The system of said first user communicates with the system of said second user over the REST API. The system of the second user sends a verification tool, in the preferred embodiment a CAPTCHA question, to the system of said first user. If said first user is able to answer the CAPTCHA question properly, then a final friendship request is sent to the system of said second user. Upon receiving the request the system of said second user notifies said second user and prompts said second user to accept, reject or subscribe to said first user. In the preferred embodiment, an accept would mean both said first user and said second user would be able to send and receive data and similarly a reject would mean neither would be able to send or receive data. A subscribe selection would mean, in the example above, that said second user would be able to access said first user's data but said first user would not be able to access said second user's data. Once a relationship is established either user would be able to place the newly accepted friend into any existing grouping or create a new group for the friend to be placed in. In establishing a friendship between a first and second user, there is no involvement of any central entity, for example the developers or administrators of the system, and similarly there is no central entity that has access to any information concerning the users participating in the friendship handshake. All the friendship data, like any other data, resides in each user's system at all times. This also means that in order for the friendship to be established, both the users need to be connected through a network, else friendship cannot take place.

The other primary part of the Share module is the user's ability to share specific data with any of his trusted friends or groups. In a preferred embodiment, this is accomplished by using permissions on all data that a user owns. Each data has an associated read and write permission for individual users or for a custom group of users which can be changed by the system user to control what data other users will be able to access. When a first user's system boots, a separate Share thread starts, which is responsible to gather states for each friend in said first user's friend list. Said Share thread first goes through the friend list of said first user and pings each friend to record said each friend's online status. Said Share thread queries each online friend for any data shared with said first user and, after gathering the data, the data is displayed on said first user's UI and provides said first user with different actions that said first user can use on said data. Said data will be available on said first user's UI as long as the other user which owns said data remains online As soon as the owner of said data goes offline, said data becomes inaccessible to said first user, as all data of any user stays on the hardware controlled by that user unless a transfer is specifically made from one system to another. If any remote data is requested by said first user, in a preferred embodiment, the share thread is responsible for placing a request for the data. Once the data arrives, said first user is notified by the appropriate module or subsystem of the system.

The Comment module, 408, is responsible for storing comments written by users on or about data elements stored inside the system. It stores these comments in the SQL Database, 416. Since, in a preferred embodiment, each data item in the system is identified with a hash, this hash is the primary key that stores said comments. In a preferred embodiment each comment is stored in a simple table which stores the corresponding user ID, date and time, content of said comment, IP address, a Boolean variable specifying whether the comment is public, private, or removed, comment thread ID, and parent comment ID. This data, exposed using a REST endpoint, allows the HTML, CSS, and JavaScript code, 419, on the frontend of the system to render comments on a particular data item.

The Notification module, 409, is responsible for collecting information about and maintaining the state of events of various subsystem and modules, and allow said subsystems and modules to be queried by the UI. Central to the Notification module is the persistent storage which stores all the notifications along with the information concerning whether said notifications have been seen by the user. The UI interacts with the notification system using REST API over HTTPS, through which the user can ask for new notifications as well as mark notifications as seen. The user preferences and changes are updated in the persistent storage.

The Configuration module, 410, in a preferred embodiment, is responsible for managing various configuration parameters while running the system. Said configuration parameters allow the user to control the look and feel of the system, manage the encryption key which enables the system to securely communicate over a network, and control the location of data storage, amongst other things. Said Configuration module is initialized by the system the first time it is run on a user's computer through an interactive dialog. After the particular configuration is written into the persistent storage all subsequent runs read the configuration from the persistent storage to initialize the system. The Configuration module is preferably written to be extensible and hence maintains a proper versioning system. When some structural change happens to the configuration, leading to the release of a new configuration version, the Configuration module can automatically upgrade the user's configuration files to be compatible with the new changes.

The Permissions module, 411, is tightly integrated with the CRUD module, 402, in the system. The Permissions module uses a simplified Access Control List (hereafter referred to as "ACL") mechanism to control permissions. Each data item that is created by the CRUD module is derived from a permissible object that comes from the Permissions module. The permissible object is a simplified ACL which stores users and groups as well as roles of said users and groups. The user can modify these ACLs using the UI. The owner is always assumed to be the user, unless the data item was brought to the system from the network, either through borrowing or copying.

Once the MVC framework is setup on top of the Webserver module, 401, it is easy to add applications using the Plugin Module, 412, to the system. Example applications that may be added are: a) Link module—This plugin allows a user to create links to files and folders in the user system. The links can be made public, allowing anyone with the link to access the resource, or private, so that anyone accessing the link must supply a password to access the resource. Using private or public links allows users to share any data they own with anyone without needing would be downloaders to be running the system of the present invention. The Link module creates links dynamically upon request by the user running the system. Once created, the links are stored in persistent storage along with a handle to the file or directory pointed to, by them. The links are also registered with the web server serving the resource, to make the resource publicly visible to other users. The Link module allows users to create or delete links through the REST API over HTTPS; b) Folder module—This plugin exposes a folder on the user hardware to the web interface, with the same look and feel as the native operating system interface. Simple file operations are enabled from the web interface including: copy, move, delete, create folder or file, rename, drag and drop folders or files. The interface allows multiple views like lists or icons. It supports multi file uploads, hot keys for most actions, creating and working with archives, previews for most types of files, editing text, resizing images, favorites, getting detailed file information, calculating directory and file sizes and automatic creation of thumbnails for images; c) Photo Album module—This plugin allows for the generation of photo albums from directories stored on the user hardware. It allows multiple CSS, HTML, and JavaScript skins to be used; d) Physical Bar Code Scanner module—This plugin allows a mobile phone to read bar codes from physical objects and add those items to the user's data collection; e) Camera module—This plugin allows a user to take pictures with a mobile phone and ship said pictures to the user's system securely; f) Payment module; g) Point System module; h) Barter System; i) Email and Calendar modules; j) VOIP; k) Chat; l) Public Display of Data Items; m) Recommendation Engine; n) Privacy Friendly Targeted Advertisement Engine; o) Trust Based Social networking Platform; p) Selling module—this plugin would help users sell their electronic as well as physical media on the web; q) Lending and Borrowing module; r) Physical to Electronic Media Convertor; s) News; t) Deals; u) Credit Card Data Visualization and Interaction; and v) Office Suite module.

The Key:Value In Memory Database, 414, is used to store any information that needs to be quickly retrieved. It is used extensively by the Search module, 415, and Notification module, 409, to do atomic queuing of requests, manage search jobs and their priorities, store the indexing status of search jobs, and to manage the publish and subscribe mechanisms for the Notification module. The search system uses this database to update search job data so that the main UserServer, 413, has access to it. This memory database is preferably backed up to disk every few minutes or when the user hardware resources are not being used completely.

The Search module, 415, is preferably designed as a separate application which can be queried from the main system over an exposed REST API. The main goal of the Search module is to be able to provide the user with an interface with which said user can manage the data that is hosted in the system. In a preferred embodiment, there are two parts to the Search module, the front end and the back end. The front end provides the interface through which the user sends in queries and receives responses back from the Search module. The interface doubles up as the gateway through which the main system also interacts with the search module through the use of system messages and notifications. Examples of such communications include messages about the addition of new data items in the system. Such additions automatically trigger notifications that are passed on to the search module so that the newly added data can be added to the search module for further processing. The backend of the Search module consists of two parts—the indexer and the searcher. The indexer is responsible for indexing the media that has been added to the system and runts in its own thread and continuously updates the index with newly indexed material that can then be searched from the searcher. The searcher accepts queries that are submitted to it and then searches the index to retrieve the relevant results. The searcher is preferably designed in a way that the searches are fast and that the user does not have to wait a very long time for a response. Moreover, the architecture of the Search module is pluggable, implying that whenever new types of data or media become available in response to new modules, subsystems or components being added to the system, the searcher can also be augmented seamlessly in order to be able to handle the new media or data types. The searcher is preferably also robust and scalable and does not need a lot of system resources. Thus it is possible to let the search system run in the background without affecting the performance of the user's system.

Any long term storage for the system is done in the SQL Database, 416. Long term storage may be required by a variety of subsystems, modules and components, for example the Comment Module and Plugin Subsystem. Media items or data is mostly stored on the operating system file system using hashes as directory names and is not stored in the SQL Database. The SQL Database stores all the access and authorization information for friends, e.g. shared keys, names, access times, etc. Plugins store varied types of information in the SQL Database. E.g., the Link Plugin, 412, stores web access keys and URLs pointing to files or folders in this database.

The ETConnector, 417, maintains one or more persistent encrypted network connections to one or more of the machines in the ETCloud, 416. The system runs an internal HTTPS Webserver, 401, on a free port. A user sitting remotely must connect to this particular server to enable secure browsing. The ETConnector has the knowledge of what port the system is running its HTTPS Webserver on. When the system boots and after authentication, the ETConnector first requests the RegCloud for the name of the ETCloud machines that it can connect to. The RegCloud returns a list of ETCloud servers as well as a cryptographic nonce, which is then used by the ETConnector to create persistent connections to those machines in the ETCloud. Any connection that comes to the ETCloud is routed to the ETConnector using the persistent link, which is further forwarded or tunneled to the local HTTPS server. Preferably, in case of multiplexed data, the ETConnector does the demultiplexing. In case the connections are mad as web and mobile clients connect to the ETCloud, there is an additional pool of connections that are made from the ETConnector to the ETCloud to reduce latency. In the preferred embodiment there is a set of five extra connections that are maintained in the pool. The network connections are preferably all TCP/IP, but UDP or other customized network protocols could be used for this purpose.

The ETCloud, 418, consists of multiple machines. A single machine in this cloud listens at port 443 which is open to the UserServer, 413, Web Browsers and Mobile Platforms. When a UserServer boots, the RegCloud is queried for a machine to use from the ETCloud. In a preferred embodiment this query gives the UserServer back a secret key which is only valid for one connection and for a specific time. This password is called the Time-Based One-Time Password Algorithm and the secret key used her is a cryptographic nonce. Once a UserServer is authenticated at the preferred ETCloud machine, the connection just acts as a multiplexed line for all the browser and mobile device connections that use the URL associated with the UserServer. In one embodiment, at least one connection is kept open from the UserServer to the ETCloud machine for each web and mobile connection.

The ETCloud machine is preferably responsible for: a) letting browsers, UserServers and mobile platforms connect to the ETCloud; b) authenticating UserServer connections; c) tunneling web and mobile connections to the right UserServer that is connected to the ETCloud; d) regulating flow control on the multiplexed channel that connects the ETCloud to a given UserServer; and e) maintaining data about user network usage and machine network usage for dynamic decisions on routing and machine assignments.

In a preferred embodiment, in order to build redundancy, one user can connect to multiple machines in the ETCloud. The DNSCloud only reports to browsers those machines which are up and have light loads to connect to the backend. This practice automatically builds load balancing and fault tolerance into the ETCloud design.

The web and mobile platforms, 419, are powered by HTML, CSS and JavaScript technologies. The UserServer uses REST APIs to ship data to these platforms which are then used by said technologies to display the UI and enable interactions between the system and the user. The web platform registration is facilitated by the IdCloud, again using REST APIs. After the user is connected, all communication is encrypted from the browser to the UserServer. The browser now acts a private internet platform where the user can interact with the UserHardware without being tracked or otherwise monitored by a third party. In a preferred embodiment, the mobile platform is first registered by using either a bar code or QR code on the UserServer, or by using the IdCloud to register. Once the mobile or web platform is identified with a UserServer, it uses HTTPS URLs to access the UserServer. This access allows mobile applications to become privacy friendly by using the UserServer as a data store. E.g., mobile pictures or videos can be stored on the UserServer, users can share media and associated comments securely through the UserServer and Users can acquire data on physical media and store it on the UserServer.

FIG. 5 is a flow diagram demonstrating the flow of information between various components of the system. ETCloud, RegCloud, Synced Database and DNSCloud are all high availability clouds. In a preferred embodiment, when a user registers with RegCloud, a shared secret key is issued to identify the user and is stored in the Synced Database. The ETCloud gets a copy of the shared key as well. The synced database can be run on multiple systems but keeps the data synchronized between said multiple systems. In the preferred embodiment the PAXOS algorithm to synchronize the database. Once the user is registered, the shared secret key is used by the user controlled hardware to connect to ETCloud. When a user uses a browser to connect to his user controlled hardware, the browser looks up the IP of the hostname in the URL. The DNSCloud uses the Synced Database to lookup the correct IP value for the given user and returns it. The browser then connects to the ETCloud with that IP which is internally tunneled by the ETCloud to the UserServer. This connection is encrypted, preferably using the HTTPS protocol. The ETCloud constantly updates the RegCloud and in turn the Synced Database, about which UserServers are active, which connections between User Browsers and UserServers are active, and how much data is flowing through the ETCloud for a particular user. This data enables the RegCloud to calculate quotas on users as well as helps the ETCloud in load balancing.

FIG. 6A illustrates one embodiment of a first user connecting to the hardware of a plurality of users to access the contents of the hardware of said plurality of users. After said first user has established a secure encrypted tunnel network connection to the hardware of said first user, if a trusted relationship exists between said first user and said plurality of users, said first user is able to view the metadata of the contents of the hardware of said plurality of users. Said first user is able to direct the hardware of said first user to download items from the hardware of said plurality of users.

FIG. 6B illustrates another embodiment of a first user connecting to the hardware of a plurality of other users to access the contents of the hardware of said plurality of users. After said first user has established a secure encrypted tunnel network connection to the ETCloud, the ETCloud can directly establish a connection with the hardware of said plurality of users. Said first user is then able to directly download items from the hardware of said plurality of users.

FIG. 7 displays a flow chart showing how a first user forms a trusted relationship with a second user. After said first user establishes a secure encrypted tunnel network connection to said first user's hardware, in a preferred embodiment, said first user will select an option through a user interface to add a friend. The hardware of said first user sends a request to the hardware of the said second user. The hardware of said second user sends a CAPTCHA or other verification test to the hardware of said first user. If said first user successfully satisfies the verification test the hardware of said second user is notified. The hardware of said second user will then send a random password to the hardware of said first user through a secure encrypted tunnel network connection which will grant access to the hardware of said second user, and the hardware of said first user will likewise send a random password to the hardware of said second user which will grant access to the hardware of said first user. The metadata of the contents of said first user's hardware and said second user's hardware will now be available to either user.

Having described the invention, I claim:

1. A method for creating and managing a distributed privacy preserving framework platform for storing a plurality of digital data and content items and launching a plurality of computer based applications between a plurality of entities connected by a computer network, comprising:
   a) Providing an abstraction layer over a native operating system an underlying computer;
   b) Providing an encapsulated webserver for each individual user;
   c) Providing a mechanism for installation of substituent applications upon the framework platform;
   d) Enabling the substituent applications to utilize network connections of the underlying computer;
   e) Providing a graphical user interface for interaction with said framework platform; and
   f) Providing an interface to be used by the substituent applications to read and write data on hardware of the individual user without compromising security and integrity of the corresponding computing system.

2. The method for creating and managing a distributed privacy preserving framework platform of claim 1, wherein encrypted communications between the each individual user and said webserver are formed by a method comprising:
   a) The individual user entering a URL into a web browser;
   b) URL being dynamically resolved using a DNS cloud to a second cloud; and
   c) Second cloud acting as a dynamic real-time reverse proxy to the hardware of the individual user, thus allowing formation of an encrypted tunnel between the web browser and the hardware.

3. The method for creating and managing a distributed privacy preserving framework platform of claim 1, wherein communication between multiple entities utilizing the framework platform comprises:
   a) A first device submitting a login request to a second device through the use of an internet browser and submitting authentication credentials to the second device to verify access levels of the user submitting the request;
   b) A second device references ownership or privilege data that details which of said plurality of devices is allowed to access a plurality of particular digital content or data items stored on said second device;
   c) Said second device confirms that said first device may access said plurality of particular digital content or data items;
   d) Said second device grants access to said first device to access said plurality of particular digital content or data items; and
   e) Any of said plurality of the particular digital content or data items or communication messages are transferred between said first and second devices over an encrypted network channel.

4. The method for creating and managing a distributed privacy preserving framework platform of claim 3, wherein the particular digital data or content item of the first device to be read or transferred to the second device is further cryptographically disguised by applying an algorithm wherein the bits of the particular digital data or content item are rearranged to provide a second layer of encryption.

5. The method for creating and managing a distributed privacy preserving framework platform of claim 1, wherein the each individual user is presented with a desktop application which, when installed, gives the individual user the capability to launch and maintain a plurality of data and applications on said platform.

6. The method for creating and managing a distributed privacy preserving framework platform of claim 1, wherein the each individual user of a first device authorizes one or more users of one or more corresponding second devices, through a one-way or two-way friendship, to access a plurality of files located on a first device for reading or copying onto said corresponding second device after receiving a request to read or copy said files with an authentication method, comprising:
   a) The user of said corresponding second device submits identifying information through an Internet browser, said Internet browser contacts the first device through an Internet communication;
   b) The user of said corresponding second device submits to the first device a request to create a trusted encrypted connection, referred to as a friendship link, which is persistent across sessions;
   c) The individual user of said first device receives said request to create said trusted encrypted connection;
   d) The individual user of said first device accepts or declines said request; and
   e) If the individual user of said first device accepts said request, said trusted encrypted connection is formed between said first device and said corresponding second device and the individual user of said first device assigns permissions to the one or more users of said one or more corresponding second devices so that the one or more users of said corresponding second device can access and copy a whole or part of the plurality of data and applications being hosted on the first device.

7. The method for creating and managing a distributed privacy preserving framework platform of claim 6, wherein the individual user and said one or more users is the same user.

8. The method for creating and managing a distributed privacy preserving framework platform of claim 1, wherein any authorized user is able to access said plurality of substituent applications hosted on a remote disk drive via a persistent encrypted connection if said authorized user has sufficient permissions to access said remote disk drive and substituent applications.

9. The method for creating and managing a distributed privacy preserving framework platform of claim 1, wherein the digital item that is stored on the devices of said plurality of entities may be encrypted.

10. The method for creating and managing a distributed privacy preserving framework platform of claim 1, wherein said substituent applications comprise:
   a) An email module;
   b) A photo viewing and sharing module;
   c) A search engine module;
   d) A social networking module;
   e) A texting or messaging module;
   f) A video chatting module; and
   g) An e-reader and library module.

11. The method for creating and managing a distributed privacy preserving framework platform of claim 10, wherein the content of modules and applications are entirely hosted on user controlled hardware, and remotely accessible from a network enabled device via a persistent encrypted connection once said device is verified by said user controlled hardware.

12. The method for creating and managing a distributed privacy preserving framework platform of claim 1, further comprising a pluggable architecture with an exposed API for application developers to develop and deploy applications for installation.

13. The method for creating and managing a distributed privacy preserving framework platform of claim 1, wherein private links and associated file or directory handles pointing to a data item can be generated and stored in persistent storage, said private links being registered with the webserver to make said data item publicly visible while requiring a password to become accessible.

14. The method for creating and managing a distributed privacy preserving framework platform of claim 1, wherein public links and associated file or directory handles pointing to a data item can be generated and stored in persistent storage, said public links being registered with the webserver to make said data item publicly visible while requiring a password to become accessible.

* * * * *